United States Patent [19]
Wyatt

[11] 3,883,029
[45] May 13, 1975

[54] STACKABLE TRAYS AND CUPS
[75] Inventor: William B. Wyatt, Nashville, Tenn.
[73] Assignee: Aladdin Industries, Incorporated, Chicago, Ill.
[22] Filed: Nov. 30, 1972
[21] Appl. No.: 310,684

[52] U.S. Cl. ............... 220/23.83; 206/72; 206/821; 206/501; 206/506; 220/23.86; 224/46 T; 224/48 R
[51] Int. Cl. ......................... B65d 1/34; A47g 19/00
[58] Field of Search .............. 220/23.6, 23.8, 23.83, 220/23.86, 97 R; 206/DIG. 11, 72; 224/48 R, 46 T

[56] References Cited
UNITED STATES PATENTS

| | | | |
|---|---|---|---|
| 2,766,919 | 10/1956 | Randall | 206/72 |
| 2,837,388 | 6/1958 | Majeroni et al. | 220/97 R |
| 3,057,510 | 10/1962 | Blacker | 220/23.6 |
| 3,078,020 | 2/1963 | Boonstra | 224/48 R |
| 3,103,303 | 9/1963 | Lynchey | 206/72 |
| 3,376,974 | 4/1968 | Hilliard | 206/72 |
| 3,532,247 | 10/1970 | Bridges | 220/23.6 |
| 3,647,104 | 3/1972 | Goings | 220/23.8 |
| 3,656,681 | 4/1972 | Goings | 220/23.8 |
| 3,704,779 | 12/1972 | Nigg | 220/97 C |

FOREIGN PATENTS OR APPLICATIONS

| | | | |
|---|---|---|---|
| 13,007 | 6/1913 | United Kingdom | 224/46 |
| 254,533 | 7/1926 | United Kingdom | 220/23.8 |
| 1,151,151 | 5/1969 | United Kingdom | 224/48 R |

*Primary Examiner*—William I. Price
*Assistant Examiner*—Joseph M. Moy

[57] ABSTRACT

A food service tray is provided with a central flat portion for holding food to be served. If desired, the central flat portion may be compartmented and the tray and compartment walls formed out of insulating materials. A ledge extends alongside of the central flat portion and is provided with a pair of holes. Included are a tall drinking container and a short drinking container, each provided with a supporting surface so that they may be partially inserted through the ledge holes. A plurality of such trays and their associated drinking containers may be stacked with the bottom of a tall drinking container extending into a short drinking container supported on the ledge of the tray below.

1 Claim, 4 Drawing Figures

PATENTED MAY 13 1975  3,883,029
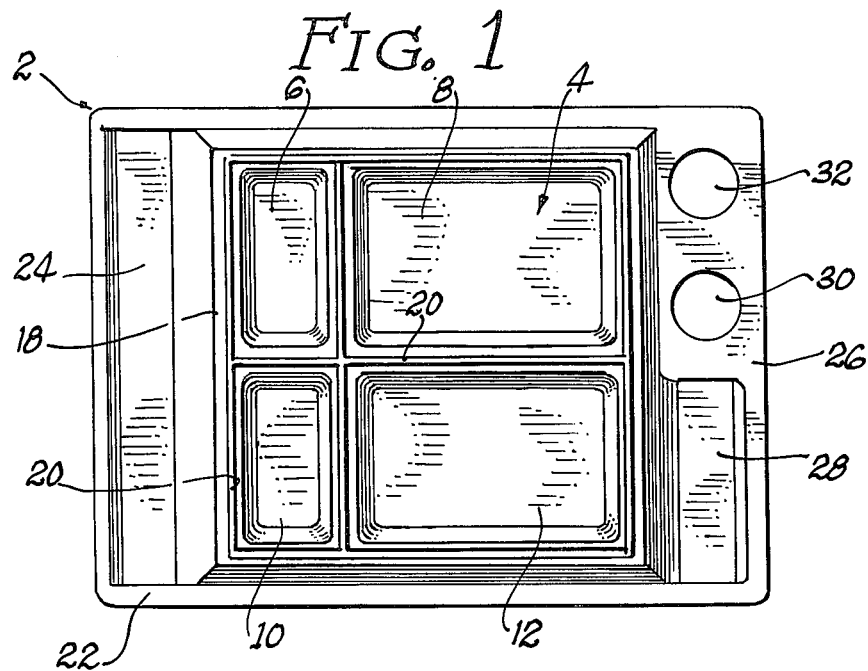
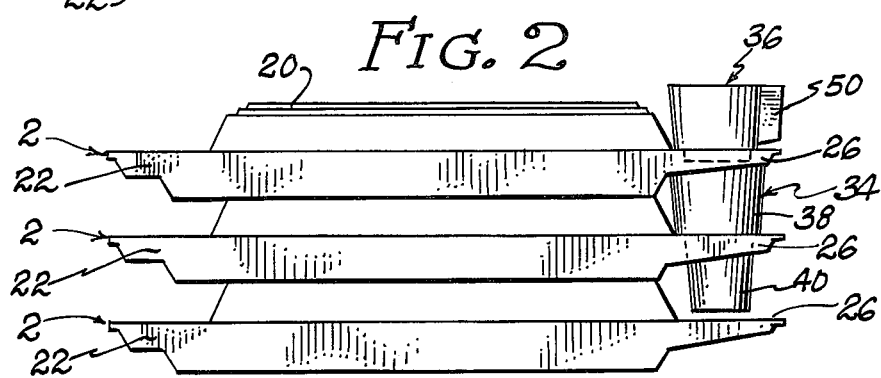
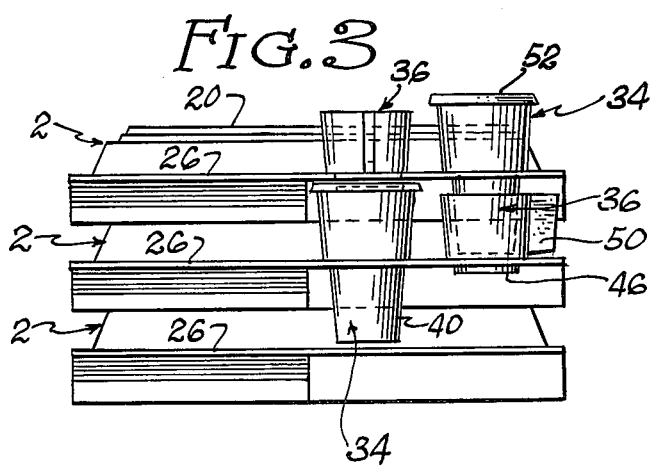
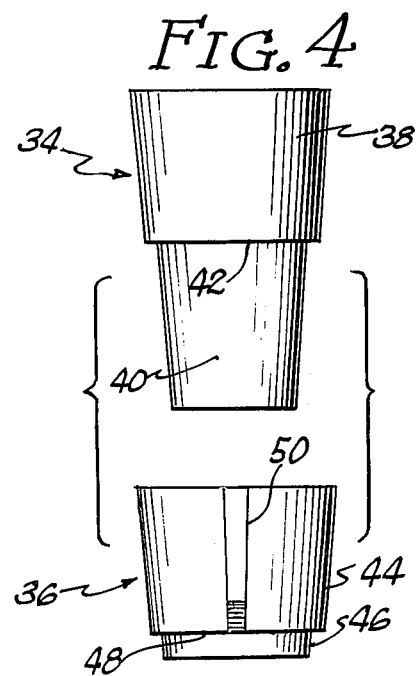

STACKABLE TRAYS AND CUPS

BACKGROUND OF THE INVENTION

This invention relates generally to food service trays. More specifically, it relates to food service trays in combination with drinking containers.

It is generally desired in food service systems in institutions such as hospitals, nursing homes and the like to provide a food service which permits personnel to easily handle a number of individual means at one time. In institutions of the type indicated, the food is usually prepared in a central kitchen and then transported to the individuals in their rooms or wards. In recent years, a food service system which has found wide acceptance is that disclosed in the patent to Bridges U.S. Pat. No. 3,532,247 issued on Oct. 6, 1970. The system disclosed in this patent consists of a stackable insulated tray having a plurality of compartments for holding individual food portions.

In institutional food service it is most frequently desired to provide a person with a relatively generous amount of liquid such as coffee, tea, milk or the like. This is frequently done by including on the serving tray a cup and more than one serving of the liquid held in a small carafe or bottle from which the liquid may be poured into the cup. When such containers are placed on the top of the tray they of necessity increase the overall height of the individual service and may render stacking impossible. In order to enhance the utility and application of a food service system such as shown in Bridges U.S. Pat. No. 3,532,247, this application discloses means whereby a drinking cup and liquid holding container can be provided on a tray while not increasing its height.

It is believed that the utility of such a system can be further enhanced by providing a means whereby stackable insulated trays, like those shown in the Bridges patent, may be used along with drinking containers which very frequently accompany the meal being served. For instance, it is very commonly desired to serve both a hot liquid such as coffee and a cold liquid such as milk or juice. Usually, the hot liquid is consumed from a relatively short drinking container, that is, a coffee cup of one design or another while the cold liquid is served in a relatively tall drinking container, a tumbler or glass. Thus, it is desired to supply to each person being served two drinking containers, one relatively short and one relatively tall.

It is an object of this invention to provide a serving tray including means for holding two drinking containers, one relatively short and one relatively tall.

It is a further object of this invention to provide serving trays which may be stacked one on top of the other along with at least two drinking containers, one relatively short and the other relatively tall, without increasing the height of the stack of trays beyond that necessary if no drinking containers were included.

BRIEF SUMMARY OF THE INVENTION

Briefly, a preferred embodiment of the invention comprises a serving tray having a central flat portion for holding food to be served and a ledge extending along one side of the central flat portion. Vertically extending openings in the ledge accommodate drinking containers which may partially nest one within the other.

BRIEF DESCRIPTION OF THE DRAWING

The invention itself is set forth in the claims appended hereto and forming a part of this specification while an understanding of an embodiment thereof may be had from the detailed description taken in conjunction with the drawing in which:

FIG. 1 is a top view of a tray in accordance with the invention;

FIG. 2 is a front elevation of a number of trays of the invention stacked and holding cups in accordance with the invention;

FIG. 3 is a side elevation of the embodiment of FIG. 2; and

FIG. 4 is a side view of nestable drinking containers in accordance with the invention.

DETAILED DESCRIPTION

Referring first to FIG. 1 of the drawing, there may be seen a tray 2 having a central portion 4 which is formed with a plurality of compartments 6, 8, 10 and 12. The particular shape or configuration of the compartments is not critical and their shape, as well as their number, may be altered by a designer to suit his particular purposes. Each compartment is surrounded by side walls, 18 for instance, which may be relatively thick and formed from insulating material to provide good thermal insulation. Provided on the tops of the side walls are sealing elements 20 adapted to engage with complementary sealing elements on the bottom of a similar tray. It should be appreciated that the tray as described thus far is generally similar to that shown in Bridges U.S. Pat. No. 3,532,247 so that a plurality of such trays may be stacked one on top of the other as shown in FIGS. 2 and 3. When so stacked, they will provide a plurality of insulated food holding compartments in the same manner as the trays of the Bridges patent.

Extending along one side of the central position 4 is a first ledge 22 which is formed with a receptacle or dished portion 24 therein to receive various food service auxiliary items such as condiments. Formed on the other side of the central portion 4 is a second ledge 26 provided with a receptacle or dished portion 28 and a pair of aligned holes or openings 30 and 32. Eating utensils may be placed in the receptacle 28 while the holes 30 and 32 receive drinking containers as described hereinafter.

As is best shown in FIG. 4, the drinking containers comprise a relatively tall drinking container or tumbler 34 and a relatively short drinking container or cup 36. The tumbler may be used as a carafe or bottle and the liquid, either hot or cold, placed therein while the cup is sent empty. At the place of service, the user pours the liquid from the tumbler into the cup in order to drink and because the tumbler is bigger he is provided with more than one cup of liquid. Alternatively, the tumbler may be used to serve cold liquids such as water, milk or juice while the cup may be used to serve hot liquids such as tea or coffee. The tumbler 34 is provided with an upper portion 38 and a lower portion 40 separated by a shoulder or supporting surface 42. In the embodiment illustrated, the outer diameter of the portion 40 is less than that of the portion 38 with their point of juncture forming the shoulder or supporting surface 42. Various alternative designs could be used. For instance, the container 34 could be provided with a simple tapering side so that the supporting surface comparable to 42 would simply be provided by the outer diameter of the container somewhere along its length. Alternatively, a continuous supporting surface such as shown at 42 need not be provided but rather it could be constituted by projections formed on the side of the container. In any case, the term supporting surface is intended to mean the presence of a surface dimensioned to limit the passage of a container through a ledge hole.

The container 36 likewise is formed with an upper portion 44 and a lower portion 46 separated by a shoulder or supporting surface 48. Since it is intended that the container 36 be used for hot liquids a handle 50 may be provided. Obviously, the design of the container 36 may be modified in the same fashion as suggested for the design of the container 34.

When it is desired to make food service with the tray and container shown, the trays may be stacked as shown in FIGS. 2 and 3. When the trays are stacked, the containers are placed on each tray in the following manner. A container 34, after being filled with the desired liquid to be consumed, may have a cover 52 placed thereon and inserted in an opening 30 until the supporting surface 42 engages the sides of the opening to prevent further movement of the container therethrough. A container 36 is placed in the hole 32 until its supporting surface 48 likewise prevents further movement through that hole. No liquid would be poured at this time into the container 36 for it is contemplated that the hot liquid would be poured at the actual point of service after the trays have been distributed. The next tray 2 is placed on the stack and at this time the container 36 is passed through the opening 30, it being noted that its lower portion 46 is short enough so that it does not contact the top 52 of the container 34 below it. A filled container 34 is then passed through the opening 32 so that its bottom portion 40 extends into or nests within the container 36 below it. The stacking operation may be continued with more trays and more containers resulting in an arrangement whereby there are two columns of alternating relatively short and relatively tall containers passing through each of the openings 30 and 32.

In this manner, a stack of trays and containers of different sizes may be provided and, as may be seen, the overall height of the stack is not increased because of the presence of the containers. At the same time, at each serving location a complete food service including two drinking containers is provided. Other uses may be found for the trays and containers of the invention other than that proposed.

Obviously, modifications other than those suggested above may be possible and it is intended by the claims to cover all such modifications as would be within their scope.

What is claimed as new and desired to be secured by Letters Patent is:

1. A food service system comprising a stack of trays, each tray having a central portion and a ledge extending from said central portion and having upper and lower surfaces, said ledges being spaced vertically from each other, each ledge having a pair of holes formed therein to form two vertical columns of such holes, a pair of vertical columns of containers carried on said ledges and having portions extending through said holes, each vertical column of containers comprising alternating first relatively tall containers, each with a supporting surface intermediate its length in contact with an upper surface of a ledge, and second relatively short containers, each with a supporting surface intermediate its length in contact with an upper surface of a ledge, and wherein the portion of a first container below a ledge is disposed within a second container carried on a ledge below, and wherein the portion of a second container below a ledge extends only slightly below that ledge out of contact with a first container on a ledge below.

* * * * *